United States Patent [19]

Edging et al.

[11] 4,110,316

[45] Aug. 29, 1978

[54] PROCESS FOR PREPARING POLY(ETHYLENE TEREPHTHALATE)

[75] Inventors: Robert Ray Edging, Kinston; Lien-Mow Lee, Greenville, both of N.C.

[73] Assignee: E. I. Du Pont de Nemours and Company, Wilmington, Del.

[21] Appl. No.: 787,605

[22] Filed: Apr. 14, 1977

[51] Int. Cl.$^2$ ............................................... C08G 63/18
[52] U.S. Cl. ........................................ 526/68; 560/90; 528/308
[58] Field of Search ........................ 260/75 M; 560/90

[56] References Cited

U.S. PATENT DOCUMENTS

| 2,973,341 | 2/1961 | Hippe et al. | 260/75 M |
| 3,506,622 | 4/1970 | Higgins | 260/75 M |
| 4,011,202 | 3/1977 | Ebner et al. | 260/75 M |

FOREIGN PATENT DOCUMENTS

| 996,689 | 6/1965 | United Kingdom | 260/75 M |
| 1,337,751 | 11/1973 | United Kingdom | 260/75 M |

*Primary Examiner*—Lucille M. Phynes

[57] ABSTRACT

A continuous process is disclosed for direct esterification of terephthalic acid with ethylene glycol, followed by low-pressure polymerization in a continuous polymerizer and in a finisher polymerizer to produce polyester suitable for melt-spinning into yarn for textile uses. Vapors from the polymerizers are condensed in spray condensers to recover glycol liquid, which is recycled to the direct esterification reaction. Efficient operation of the spray condensers at absolute pressures of less than 60 millimeters of mercury is achieved by addition of substantially dry ethylene glycol to lower the water content of condensate used in the sprays.

5 Claims, 1 Drawing Figure

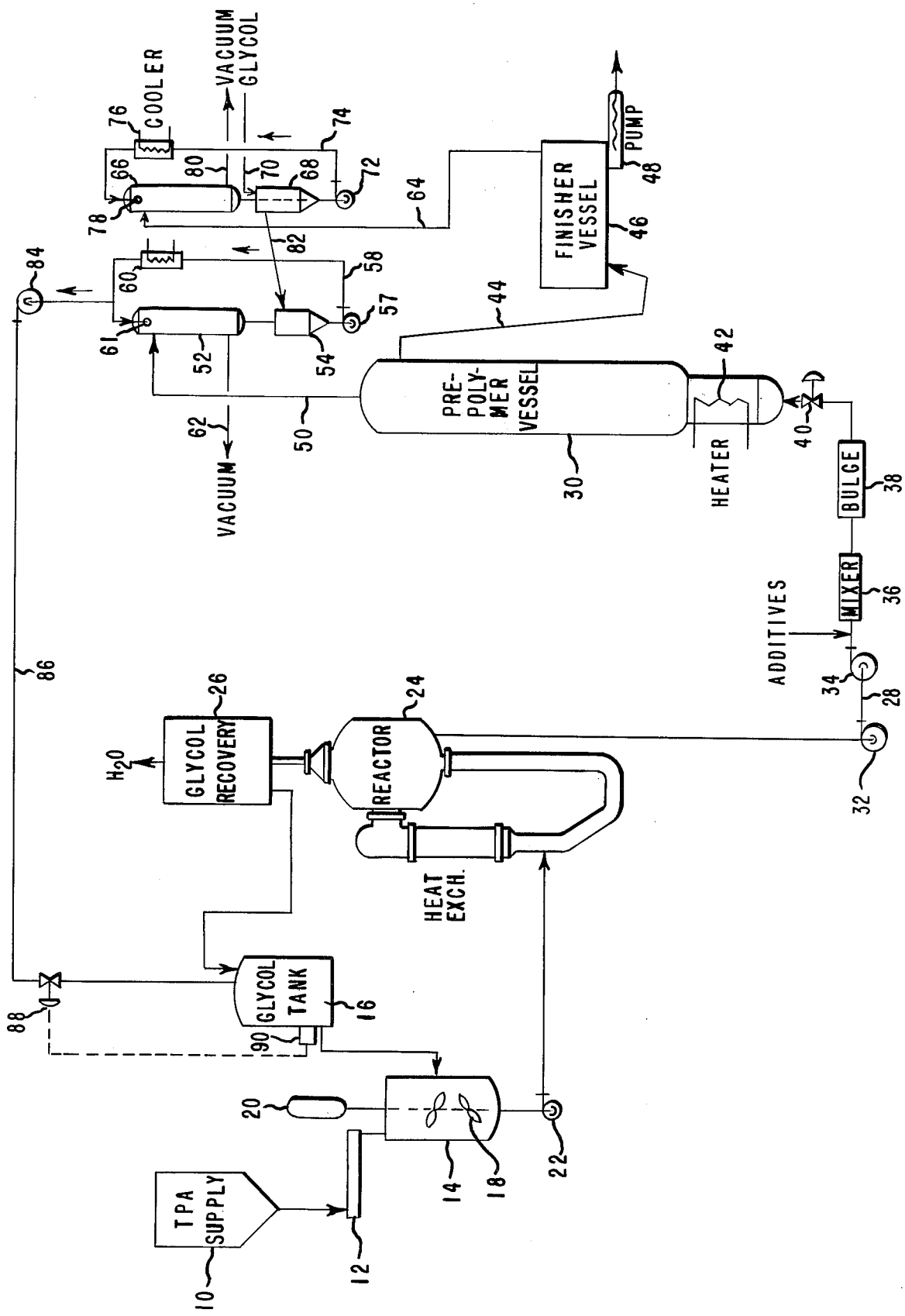

PROCESS FOR PREPARING POLY(ETHYLENE TEREPHTHALATE)

BACKGROUND OF THE INVENTION

This invention relates to a continuous direct esterification and polymerization process for producing fiber-forming polyester from ethylene glycol and terephthalic acid. The invention is more particularly concerned with continuous recovery and reuse of ethylene glycol vaporized in the polymerization reaction.

Continuous processes for direct esterification of terephthalic acid with ethylene glycol are disclosed in Leybourne III U.S. Pat. No. 3,590,072 Lewis et al. U.S. Pat. No. 3,676,485, Balint et al. U.S. Pat. No. 3,697,579 and Chapman et al. U.S. Pat. No. 3,927,982. The terephthalic ester is subsequently converted to a high molecular weight polyester by condensation polymerization under low absolute pressure conditions. Higgins U.S. Pat. No. 3,506,622 illustrates a process in which the terephthalate ester passes continuously from the esterification reaction into a prepolymerizer, wherein an initial polymerization occurs at about 250° to 285° C and absolute pressures of about 5 to 60 millimeters mercury, and the prepolymer formed passes into a final polymerizer wherein further polymerization is conducted at similar temperatures but a lower pressure of about 0.5 to 10 millimeters mercury to produce polyester for extrusion into fibers or filaments. The Higgins patent teaches that ethylene glycol recovered from the polymerization can be used directly in the direct esterification reaction without detrimental effects.

In a continuous process of the above type, vapors are formed during polymerization which consist primarily of ethylene glycol but which also contain from about 2 to about 35 weight percent of water vapor. It is important to recover the ethylene glycol for reuse. The vapors from the polymerization vessels can be condensed and recycled for use in the feed to the direct esterification reaction without removing the water. However, a highly efficient process is required for condensing the vapors, since the capacity and the efficiency of vacuum pumping means for maintaining the low pressure used in polymerization depends on the load of uncondensed vapors.

SUMMARY OF THE INVENTION

The present invention is an improvement for continuously recovering and reusing ethylene glycol from polymerization vapors in a continuous direct esterification and polymerization process of the type wherein a feed of ethylene glycol and terephthalic acid in molar proportions of 1.5 to 4.0 (preferably 1.8 to 3.0) glycol to 1.0 terephthalic acid is heated in reaction product at about 280° to 315° C and about atmospheric pressure to esterify the terephthalic acid and form an ester reaction product having an average degree of polymerization of 2 to 10, the ester product is heated at 250° to 300° C and low absolute pressure in a continuous polymerizer to form a prepolymer, and the prepolymer is heated at 270° to 305° C and substantially lower absolute pressure in a finisher polymerizer to form a polymer for spinning into filaments. The improvement of this invention comprises, (a) conducting vapors of ethylene glycol and water from the continuous polymerizer into a spray condenser at the pressure in the polymerizer, spraying the vapors with ethylene glycol liquid containing less than 10 (preferably from 2 to 7) weight percent water to condense substantially all of the vapors, combining the condensate with ethylene glycol liquid containing less than 3 weight percent water to form ethylene glycol liquid, containing less than 10 (preferably from 2 to 7) weight percent water, for use in spraying the vapors and for reacting with terephthalic acid to form ester reaction product;

(b) conducting vapors of ethylene glycol and water from the finisher polymerizer into a spray condenser at the pressure in the finisher polymerizer, spraying the vapors with ethylene glycol liquid containing less than 3 weight percent water to condense substantially all of the vapors, combining the condensate with ethylene glycol liquid containing less than 1 weight percent water to form ethylene glycol liquid, containing less than 3 weight percent water, for use in spraying the vapors and for combining with the condensate produced in condenser system (a), the glycol containing less than 1 weight percent water being added at a rate of about 0.4 to 1.15 mole of glycol per mole of ethylene terephthalate in the polymer produced; and (c) continuously transferring ethylene glycol liquid from finisher condenser system (b) to system (a), and from system (a) to the esterification reaction, at rates determined by the rate at which ethylene glycol is used in the esterification reaction.

The ethylene glycol liquid containing less than 1 weight percent water which is used in finisher condenser system (b) will usually be virgin glycol, i.e., glycol which has not been used previously and usually has less than 0.1 percent water.

The usual additives may be incorporated in the polymer. These are preferably added to the feed to the continuous polymerizer, as a suspension or solution of additive in ethylene glycol containing less than 1 weight percent water. A slurry of $TiO_2$ delustrant in ethylene glycol containing less than 1 weight percent water is preferably mixed with the ester product prior to feeding the ester product to the continuous polymerizer, the rate of glycol addition to the ester product being about 0.25 to 0.60 mole of glycol per mole of ethylene terephthalate in the polymer produced. The total rate of addition of ethylene glycol to the ester product and to the finisher condenser can be adjusted to about 1 mole of glycol per mole of ethylene terephthalate in the polymer produced. The $TiO_2$ slurry mixed with the ester product may include one or more additional additives, e.g., color inhibitors, dyeability modifiers, coloring materials, or cross-linking additives.

The process is preferably operated so that ethylene glycol is recycled to the esterification reaction from the polymerizer condenser systems at a rate of about 0.75 to 1.50 mole of glycol per mole of ethylene terephthalate in the polymer produced.

BRIEF DESCRIPTION OF THE DRAWING

The drawing is a diagrammatic flow sheet to indicate apparatus used in the process of this invention.

DETAILED DESCRIPTION

As shown in the drawing, terephthalic acid is supplied from bin 10 by screw feeder 12 to mixing tank 14. Ethylene glycol is supplied to the mixing tank from glycol tank 16 at a rate within the range of 1.5 to 4.0 (preferably 1.8 to 3.0) moles of glycol per 1.0 mole of terephthalic acid. The reactants are mixed to form a slurry by mixer 18 which is driven by motor 20. Slurry pump 20 feeds the slurry to the direct esterification reactor 24, which may be of the type disclosed in Chapman et al. U.S. Pat. No. 3,927,982. The reactants are heated in reaction product at about 280° to 315° C and about atmospheric pressure to esterify the terephthalic acid and form an ester reaction product having an average degree of polymerization of 2 to 10. Reaction vapors are conducted to a glycol recovery system 26, which may be any suitable equipment for removing water and organic byproducts of the reaction from the glycol, and recovered glycol is recycled to the glycol tank 16.

Liquid ester reaction product is withdrawn continuously from the reactor and pumped through transfer line 28 to continuous polymerizer 30 by stuffer pump 32. Additives of the types indicated below may be mixed with the ester reaction product passing through the transfer line. For this purpose, a slurry or solution of one or more additives in ethylene glycol is introduced into the transfer line at a rate determined by passage of the ester reaction product through meter pump 34. A mixer 36 and a bulge 38 having 1 to 10 minutes holdup time are used to completely incorporate the additives. An amount of ethylene glycol is preferably used which provides a rate of glycol addition of about 0.25 to 0.60 mole of glycol per mole of ethylene terephthalate in the polymer produced. Additives which may be introduced include the following:

a. Delustrants such as $TiO_2$.

b. Polymerization catalysts such as antimony glycolate, antimony oxide, and titanium compounds.

c. Color inhibitors such as phosphoric acid and triphenyl phosphite.

d. Dyeability modifiers such as 1,3-dihydroxyethyl-5-(sodium sulfo)-isophthalate, dihydroxyethyl adipate. dihydroxyethyl glutarate, adipic acid and glutaric acid.

e. Coloring materials such as pigments, dyes, fluorescent brightening agents and cobalt color toning agents.

f. Cross-linking compounds such as trimethylolpropane.

Viscosity building compounds such as tetrakis(2-hydroxyethyl)silicate may be added to the prepolymer prepared subsequently.

The continuous polymerizer 30 may be an upflow prepolymerizer of the type disclosed in Vodonik U.S. Pat. No. 2,727,882. The feed passes upward into the polymerizer column through back-pressure valve 40 and heater 42, which maintains a temperature within the range of 250° to 300° C. Prepolymer having a relative viscosity (HRV) of about 5 to 8 is withdrawn near the top of the column and passes through transfer line 44 to finisher polymerizer 46, which may be of the type disclosed in Kilpatrick U.S. Pat. No. 3,248,180. The finisher vessel is heated to maintain a temperature within the range of 270° to 305° C. Polymer having a relative viscosity (HRV) of about 12 to 29 is withdrawn through screw pump 48 for spinning into textile filaments. The process can be operated to produce higher relative viscosity polymer for spinning into industrial filaments.

Vapors from the continuous polymerizer 30 pass from the top of the column through vapor line 50 to condenser 52. The vapors contain ethylene glycol, about 2 to 35 weight percent water, about 1 to 4 weight percent of organic materials which form solids at lower temperatures, and small amounts of other organic impurities. Condensate from the vapors flows into hotwell 54 where it is combined with ethylene glycol containing less than 3 weight percent water to form a mixture containing less than 10 (preferably 2 to 7) weight percent water for use as spray in the condenser. Pump 57 supplies the mixture to the top of the condenser through line 58 and cooler 60. In order to operate at the desired pressures, the cooled spray mixture should be at a temperature of less than 60° C, and preferably less than 50° C. The cooled mixture is sprayed on the vapors in the condenser by spray head 61. Vacuum line 62 leads to vacuum pumping means (not shown) for maintaining the condenser and the continuous polymerizer at an absolute pressure of 5 to 60 millimeters mercury (0.67 to 8.0 kPa). A glycol spray containing 2 to 7 weight percent water is highly efficient in condensing the vapors to minimize the load on the vacuum pumping means. The spray also prevents solids from depositing on surfaces to cause fouling.

Vapors from the finisher polymerizer 46 pass from the finisher vessel through vapor line 64 to condenser 66. Condensate from the vapors flows into hotwell 68 where it is combined with ethylene glycol containing less than 1 weight percent water, from glycol line 70, to form a mixture containing less than 3 weight percent water for use as spray in the condenser. The low water content is needed because the pressure in the finisher vessel and its condenser 66 is lower than in the continuous polymerizer vessel and its condenser 52. Pump 72 supplies the mixture to the top of condenser 66 through line 74 and cooler 76. In order to operate at the desired pressures, the cooled mixture should be at a temperature of less than 60° C, and preferably less than 50° C. The cooled mixture is sprayed on the vapors in the condenser by spray head 78. Vacuum line 80 leads to vacuum pumping means (not shown) for maintaining the condenser and the finisher polymerizer at an absolute pressure of 0.5 to 10 millimeters of mercury (0.07 to 1.3 KPa) which is also lower than the pressure in the continuous polymerizer.

Ethylene glycol liquid containing less than 3 weight percent water overflows from finisher hotwell 68 to hotwell 54 through line 82. Ethylene glycol liquid containing less than 10 (preferably 2 to 7) weight percent water is transferred from hotwell 54 to glycol tank 16 through line 58, recycle pump 84 and line 86. The rate of transfer is determined by the rate at which ethylene glycol from glycol tank 16 is used in the esterification reaction. The rate of transfer is controlled by valve 88, which can be a conventional automatic valve actuated by level sensing device 90. The rate of addition of glycol to finisher hotwell 68 is similarly determined by the level of liquid in hotwell 54.

The ethylene glycol liquid containing less than 1 weight percent water used in the finisher condenser system should be added at a rate of about 0.4 to 1.15 mole of glycol per mole of ethylene terephthalate in the polymer produced. The process is preferably operated so that ethylene glycol is recycled to the esterification reaction from the polymerizer condenser systems at a rate of about 0.75 to 1.50 mole of glycol per mole of ethylene glycol in the polymer produced.

EXAMPLE

Using apparatus of the type shown in the drawing, 1200 pounds (545 kg.) per hour of terephthalic acid is reacted with ethylene glycol to form oligomer having a relative viscosity (HRV) of 2.8, which is pumped through a transfer line leading to a continuous polymerizer. Virgin glycol and additives are injected into the oligomer as follows:

(a) 38.2 pounds (17.3 kg) per hour of glycol containing 1 percent by weight of $Sb_2O_3$ polymerization catalyst.

(b) 16.4 pounds (7.45 kg) of glycol containing 20 percent $TiO_2$ delustrant, and (c) 54.3 pounds (24.6 kg) of glycol to react with free carboxyl end groups.

The oligomer, glycol and additives pass through a mixer under a pressure of 35 psig. (341 kPag) and the mixture is held under pressure in a bulge for about 5 minutes. The mixture passes through a pressure reducing valve, 56 pounds (25.4 kg) per hour of additional virgin glycol is added, and this mixture is flashed into an upflow continuous polymerizer. Prepolymer is formed having a relative viscosity (HRV) of 5.6 and a free carboxyl content of 98 equivalents per million grams. The prepolymer passes through a transfer line to a finisher polymerizer where polymer is formed which has a relative viscosity (HRV) of 21.3 and a free carboxyl content of about 28 equivalents per million grams. The polymers passes from the finishing vessel, and is melt-spun into filaments, at an average rate of 1388 pounds (630 kg) per hour. Filament yarn is produced which contains 0.9 weight percent of diethylene glycol.

Vapors from the continuous polymerizer, containing 87.2 weight percent ethylene glycol and 12.8% water, at 276° C and 24 mm mercury (3.2 KPa) pressure, are passed into a spray condenser at 151 pounds (68.5 kg) per hour. The vapors are sprayed with 200 gallons (0.757 m³) per minute of 94% ethylene glycol, 6% water liquid recirculated from the hotwell. The spray liquid is maintained at about 45.5° C by passing through a cooler between the hotwell and the spray condenser. The spray liquid and condensed vapors pass from the condenser into the hotwell, where they are mixed with 322 pounds (146 kg) per hour of ethylene glycol containing 0.95% water, from the hotwell of the finisher condenser. Ethylene glycol containing 6% water is recycled from the hotwell of the continuous polymerizer condenser at a rate of 473 pounds (214.5 kg) per hour for use in the reaction with terephthalic acid to produce oligomer.

Vapors from the finisher polymerizer, containing 91.1% ethylene glycol and 8.9% water, at 291° C and 1.3 mm mercury (0.17 KPa) pressure, are passed into the finisher spray condenser at 19.9 pounds (9.0 kg) per hour. The vapors are sprayed with 200 gallons (0.757 m³) per minute of ethylene glycol containing 0.95% water from the hotwell of this condenser. The spray liquid is maintained at about 31° C by passing through a cooler between the hotwell and the spray condenser. The spray liquid and condensed vapors pass from the condenser into the finisher hotwell, where they are mixed with 303 pounds (137 kg) per hour of virgin ethylene glycol containing about 0.1% water. Ethylene glycol containing 0.95% water overflows from the finisher hotwell to the hotwell of the continuous polymerizer condenser at a rate of 322 pounds (146 kg) per hour. The feed rate of virgin ethylene glycol is controlled by a control valve which responds to a level signal to maintain a constant level in the hotwell of the continuous polymerizer condenser.

Relative viscosity (HRV) is the ratio of the viscosity of a solution of 0.8 gm of the polyester dissolved at room temperature in 10 ml of hexafluoroisopropanol containing 80 parts per million of $H_2SO_4$ to the viscosity of the $H_2SO_4$ —containing hexafluoroisopropanol itself, both measured at 25° C in a capillary viscosimeter and expressed in the same units.

I claim:

1. In a continuous direct esterification and polymerization process wherein a feed of ethylene glycol and terephthalic acid in molar proportions of 1.5 to 4.0 glycol to 1.0 terephthalic acid is heated in reaction product at about 280° to 315° C and about atmospheric pressure to esterify the terephthalic acid and form an ester reaction product having an average degree of polymerization of 2 to 10, the ester product is heated at 250° to 300° C and low absolute pressure in a continuous polymerizer to form a prepolymer, and the prepolymer is heated at 270° to 305° C and substantially lower absolute pressure in a finisher polymerizer to form a polymer for spinning into filaments; the improvement for continuously recovering and reusing ethylene glycol from vapors formed in the polymerizers which comprises, (a) conducting vapors of ethylene glycol and water from the continuous polymerizer into a spray condenser at the pressure in the polymerizer, spraying the vapors with ethylene glycol liquid containing less than 10 weight percent water to condense substantially all of the vapors, combining the condensate with ethylene glycol liquid containing less than 3 weight percent water to form ethylene glycol liquid containing less than 10 weight percent water for use in spraying the vapors and for reacting with terephthalic acid to form ester reaction product;

(b) conducting vapors of ethylene glycol and water from the finisher polymerizer into a spray condenser at the pressure in the finisher polymerizer, spraying the vapors with ethylene glycol liquid containing less than 3 weight percent water to condense substantially all of the vapors, combining the condensate with ethylene glycol liquid containing less than 1 weight percent water to form ethylene glycol liquid containing less than 3 weight percent water for use in spraying the vapors and for combining with the condensate produced in condenser system (a), the glycol containing less than 1 weight percent water being added at a rate of about 0.4 to 1.15 mole of glycol per mole of ethylene terephthalate in the polymer produced; and (c) continuously transferring ethylene glycol liquid from finisher condenser system (b) to system (a), and from system (a) to the esterification reaction, at rates determined by the rate at which ethylene glycol is used in the esterification reaction.

2. A process as defined in claim 1 wherein the ethylene glycol liquid added in system (b) contains less than 0.1 weight percent water.

3. A process as defined in claim 1 wherein a slurry of $TiO_2$ delustrant in ethylene glycol containing less than 1 weight percent water is mixed with the ester product prior to feeding the ester product to the continuous polymerizer, the rate of glycol addition to the ester product being about 0.25 to 0.60 mole of glycol per mole of ethylene terephthalate in the polymer produced in the finish polymerizer, and the rate of glycol addition in the finisher condenser is adjusted to provide a total of about 1 mole of glycol addition per mole of ethylene terephthalate in the polymer produced.

4. A process as defined in claim 3 wherein the slurry mixed with the ester product includes one or more of polymerization catalysts, color inhibitors, dyeability modifiers, coloring materials, or cross-linking additives.

5. A process as defined in claim 1 wherein ethylene glycol is recycled to the esterification reaction from the polymerizer condenser systems at a rate of about 0.75 to 1.50 mole of glycol per mole of ethylene terephthalate in the polymer produced.

* * * * *

UNITED STATES PATENT AND TRADEMARK OFFICE
CERTIFICATE OF CORRECTION

PATENT NO. : 4,110,316
DATED : August 29, 1978
INVENTOR(S) : Robert Ray Edging et al It is certified that error appears in the above-identified patent and that said Letters Patent are hereby corrected as shown below:

Column 3, line 2, "pump 20" should read -- pump 22 --

Signed and Sealed this

Fifteenth Day of May 1979

[SEAL]

Attest:

RUTH C. MASON
Attesting Officer

DONALD W. BANNER
Commissioner of Patents and Trademarks